United States Patent [19]

Andrews

[11] Patent Number: 5,027,512

[45] Date of Patent: Jul. 2, 1991

[54] MANUAL CUTTER INSERT TOOL

[76] Inventor: Edward A. Andrews, 1475 Ravine View Ct., Bloomfield Hills, Mich. 48013

[21] Appl. No.: 520,877

[22] Filed: May 9, 1990

[51] Int. Cl.⁵ .......................... B26B 5/00; B25G 1/10
[52] U.S. Cl. .......................................... 30/169; 7/167
[58] Field of Search ................ 30/165, 169, 171, 272, 30/340, 346; 7/166, 124, 167, 168; 407/54, 66, 94, 99

[56] References Cited

U.S. PATENT DOCUMENTS

| | | | |
|---|---|---|---|
| 237,681 | 2/1881 | Fuller | 30/169 |
| 571,900 | 1/1896 | Hanstine | 30/169 |
| 910,789 | 1/1909 | Cunningham | 7/168 |
| 1,980,087 | 11/1934 | Rast | 7/167 |
| 2,519,559 | 8/1950 | Foster et al. | 7/167 |
| 4,003,418 | 1/1977 | Andersson | 7/167 |

FOREIGN PATENT DOCUMENTS

| | | | |
|---|---|---|---|
| 266740 | 6/1913 | Fed. Rep. of Germany | 7/167 |
| 51038 | 2/1930 | Norway | 30/169 |

*Primary Examiner*—Douglas D. Watts
*Assistant Examiner*—Paul M. Heyrana, Sr.
*Attorney, Agent, or Firm*—Harness, Dickey & Pierce

[57] ABSTRACT

A manual tool useful for cutting, scraping, deburring, marking and the like hand operations, is formed of an elongated handle shaped to fit within the human hand. The handle has a forward end formed with a socket for receiving a conventional, wafer-like, machine tool hard cutter insert. The insert fits within a socket which exposes a forward end of the insert and portions of the insert side edges for contact with a work piece. The insert may be fastened within the socket within the handle by means of a suitable, conventional screw fastener or the like. The insert may be pre-selected from a conventional insert having a conventional circular, square, diamond-shaped, hexagonal shape, triangular and the like peripheral edge and the socket is formed so that similar size, but different peripheral edge shaped inserts may be replaced, one for another, as desired. Thus, new or used conventional machine tool cutter inserts may be utilized in the tool at the user's option.

8 Claims, 1 Drawing Sheet

U.S. Patent    July 2, 1991    5,027,512
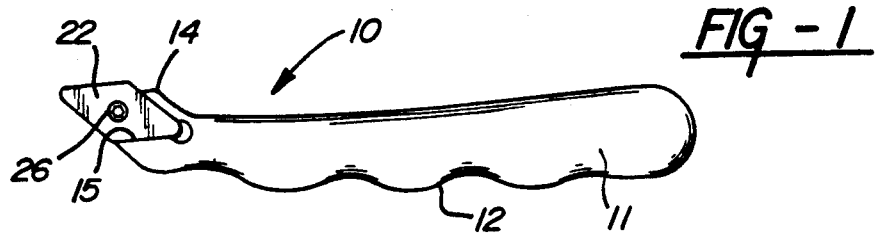
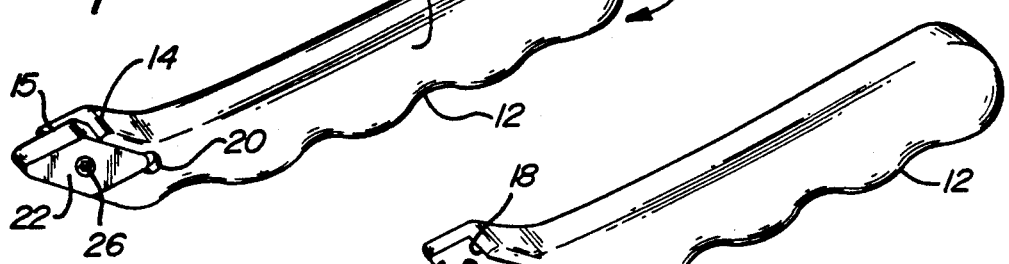
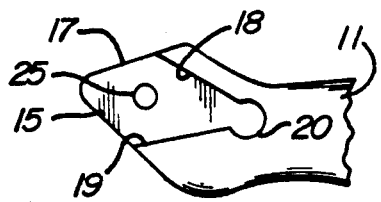
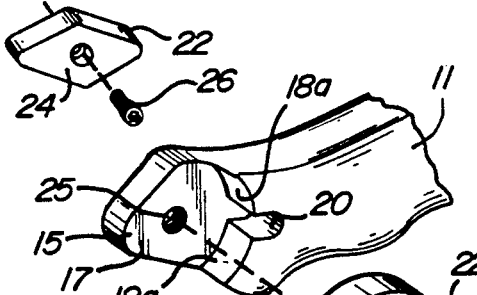
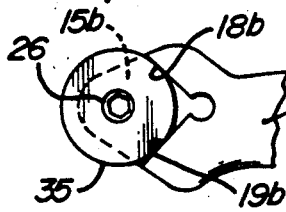
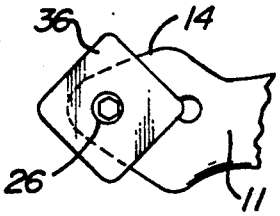
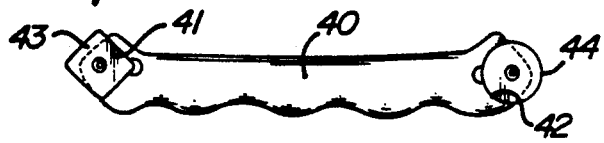
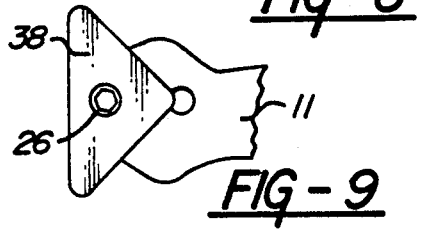

MANUAL CUTTER INSERT TOOL

BACKGROUND OF INVENTION

This invention relates to a manual or hand operated tool which utilizes conventional mass produced machine tool cutter inserts for hand working, that is, cutting, scraping and similar operations.

Machine tools, such as lathes, screw machines, boring machines and the like commonly utilize inserts for cutting the metal work piece. These inserts generally are formed, in a wafer-like shape, of hard material such as tungsten carbide or other hard carbides, ceramic materials, cermet or ceramic and coated metal compositions. Conventional inserts are formed in a variety of industry standard peripheral edge shapes. That is, conventional inserts are formed in circular, triangular, square, hexagonal, diamond and other similar peripheral shapes. Usually, inserts are fastened within a tool holder which is mounted upon a machine tool so that the inserts may bear against the work piece for cutting or scraping, etc.

It is conventional to replace worn or damaged inserts with similar inserts. Thus, when they become damaged, such as due to impacts, or worn due to extended use, they are usually discarded. Sometimes they are salvaged for their hard carbide contents. At other times, they are simply thrown away.

Frequently, damaged or worn inserts, are still useful as cutting or scraping edges where precision is not required. Even if they are not good enough for machine tool use, they may be good enough for lower quality uses.

In addition, insert manufacturers or machine tool producers frequently find it desirable to provide sample inserts to prospective customers to demonstrate new shapes or sizes or simply for goodwill purposes.

Thus, this present invention is concerned with forming a useful hand operated tool which is provided with a socket for mounting conventional used or new inserts on the end of the tool, and for easily interchanging the inserts, so as to salvage worn inserts or, alternatively, to provide samples of new inserts.

SUMMARY OF INVENTION

This invention contemplates a manually operable tool, formed in the shape of an elongated handle, which may be grasped by the user's hand with a handle front end portion extending forwardly of the hand. An open socket is formed on the end of the handle. This socket is of a size and shape to receive a conventional machine tool cutter insert and is provided with edge walls for positioning and rigidly holding the insert within the socket. Suitable, conventional screw-type insert fasteners may be used to hold the insert within the socket. Releasing the fasteners permits removing and replacing the inserts when desired.

One object of this invention is to provide a simple, inexpensive, molded plastic or cast metal handle construction having a preformed socket for holding standard commercially available inserts. Worn, salvaged inserts may be mounted within the socket. Alternatively, new or unworn inserts may be used with the tool.

Another object of this invention is to provide a simple, inexpensive, hand tool which may be either given away as a souvenir or sold inexpensively to mechanics in shops for their use as hand working tools, such as for scraping, deburring, marking, burnishing or other hand operations.

Still a further object of this invention is to provide an extremely inexpensive, manually useful tool which utilizes common, varying shape, machine tool cutter inserts to provide the cutting or scraping edges of the tool and wherein an insert of one shape may be replaced with an insert of a different shape when desired.

These and other objects and advantages of this invention will become apparent upon reading the following description, of which the attached drawings form a part.

DESCRIPTION OF DRAWINGS

FIG. 1 is an elevational view of the manual insert tool with a diamond shaped insert;

FIG. 2 is a perspective view of the tool;

FIG. 3 is a perspective view showing the diamond shaped insert removed from the socket in the handle of the tool and with the fastener screw removed;

FIG. 4 is an elevational view of the forward end of the handle, showing the insert receiving socket;

FIG. 5 is an enlarged, perspective view, of the forward end of the tool showing the socket shaped to receive a round insert with a typical insert fastener screw adjacent the socket;

FIG. 6 is an elevational view of the forward end of the tool showing a socket whose side walls are shaped to receive a variety of peripherally shaped inserts, in this case, a round insert;

FIG. 7 is a view similar to FIG. 6, but showing a square insert mounted within the socket;

FIG. 8 is a view similar to FIG. 6, but showing an hexagonal insert mounted within the socket; and FIG. 9 is a view similar to FIG. 6, showing a triangular shaped insert mounted within the socket. FIG. 10 is a plan view of a double ended tool, that is, with an insert mounted on each end.

FIG. 10 is a plan view of a double ended tool, that is, with an insert mounted on each end.

DETAILED DESCRIPTION

As illustrated in FIG. 1 and 2, the manually operable tool, generally designated 10, is formed with an elongated handle 11. The handle may be formed of molded plastic or cast metal. It is elongated to fit within the user's hand and, therefore, is provided with a shaped or contoured grip edge portion 12 for enabling the tool to be tightly held within the user's hand. The particular shape of the grip portion may be varied.

The handle forward end 14 is provided with a recessed, open end, socket 15. As shown in FIGS. 3, the socket is provided with a substantially flat face or surface 17 which is arranged in a plane which is generally longitudinal of the handle. In addition, the socket includes a pair of opposed side walls 18 and 19 which, preferably, are angled towards each other to provide a corner-like socket seat. A relief notch 20 is preferably provided at the corner where the two side walls intersect to prevent the accumulation of debris or chips or oil which might interfere with a tight fit between the socket seat and an insert placed within the socket.

A flat, wafer-like insert 22 is positioned within the socket 15. The insert is illustrated as having a diamond shaped peripheral edge. The acute angle formed by the side walls 18 and 19 corresponds to the shape of the inserts so that the insert is snugly fitted within the socket. The forward edge portion of the insert is exposed, however. In addition, preferably, one face of the insert is also exposed.

For fastening the insert within the socket, a hole 24 extends through the insert and is aligned with a threaded hole 25 formed in the socket base. A suitable, conventional screw fastener 26 extends through the aligned holes for fastening the insert to the socket. Different conventional screw fasteners are used for fastening inserts within machine tools. For example, a common screw with a head is frequently used, as are screws which have integral cams or offset portions for camming against the interior of the hole in the insert and forcing the insert against the socket seat side walls for holding it in place. Other types of screw fasteners that are also commonly used in machine tool insert fastenings and may be used.

FIG. 5 illustrates a socket 15a, which is similar to socket 15, except that its side walls 18a and 19a are shaped to match and closely receive a standard insert of a different shape. For illustration purposes, the insert 22a is circular in shape. Where other shape inserts are to be used, the socket side walls are correspondingly shaped.

FIGS. 6–9 illustrate a socket 15b which is shaped to receive several different shape inserts. Thus, its side walls 18b and 19b are angled for engaging their adjacent peripheral edges of different shaped inserts. That is, the socket, and the socket walls, are formed to receive an insert of a particular size, but of different peripheral edge shapes.

FIG. 6 illustrates a round insert 35 mounted within the socket 15b and engaged against walls 18b and 19b. A square insert 36 is mounted within the socket illustrated in FIG. 7. FIG. 8 shows a hexagonal insert 37 mounted within the socket and, FIG. 9 shows a triangular insert 38 secured within the socket.

In use, the tool may be sold as an inexpensive hand tool or it may be given as a display or a souvenir or premium, such as to a mechanic working in the shop. The user may replace the inserts, when they become damaged or too worn, with either a new insert or with a worn insert that is no longer usable on a machine tool, but is still usable for non-precision use. Hence, worn inserts may be salvaged and used with this hand tool. Thus, the tool may be optionally used with new or with used inserts. Further, the user may either have an assortment of these tools, each with a different shape insert, or he may change inserts for different tool purposes, such as for cutting, deburring, scraping or burnishing a work piece.

FIG. 10 illustrates a double ended hand tool whose handle 40 is provided with sockets 41 and 42 on its opposite ends. For illustration purposes, socket 41 receives a generally square insert 43 and socket 42 receives a round insert 44. Other shapes may be used.

This invention may be further developed within the scope of the following claims. Accordingly, it is desired that the foregoing description by read as merely illustrative of an operative embodiment of this invention and not in a strictly limited sense.

Having fully described an operative embodiment of this invention, I now claim:

1. A hand tool useful for hand working such as scraping, deburring, breaking sharp metal edges, marking and the like manual operations, comprising:
    an elongated handle shaped for fitting within a hand for manually grasping the handle along its length, with the handle having a forward end;
    a socket having a forwardly and sidewardly opened portion formed in the forward end of the said handle, with said socket including a substantially flat base surface arranged generally in a plane that extends longitudinally of the handle, and another portion of the socket including spaced apart, opposite sidewall surfaces extending perpendicularly of the base surface, said socket side wall surfaces being acutely angled relative to the forward end of the socket to form an acute angle pair of wall surfaces for receiving and supporting a corner-like portion of an insert;
    a conventional, flat, generally wafer-like, hard, disposable cutter insert closely fitted within said socket;
    with said socket being of a size to receive the insert with one flat face of the insert arranged in contact with the socket base surface and with the socket wall portions engaging opposite edge portions of said insert for removably positioning the insert within the socket, and with the insert having a forward portion extending forwardly of the handle and socket and a side edge portion extending forwardly and outwardly of the socket;
    fastening means securing the insert within the socket;
    whereby a conventional cutter insert of a predetermined peripheral shape may be rigidly secured within the socket so that the tool may be hand operated, utilizing the exposed end and edge in contact with a work piece.

2. A hand held tool as defined in claim 1, and said insert being of a pre-selected, peripheral shape, such as diamond shaped, square, round, or hexagonal which is interchangeable, for use in the same socket, with an insert of the same size and the same or a different peripheral shape than the originally pre-selected peripheral shape.

3. A hand tool as defined in claim 2, and said insert fastening means comprising a threaded opening formed in the socket base surface and a corresponding, aligned opening formed in the insert, and extending from one of its surfaces to the opposite surface, and with a screw type fastener extending through the openings in the insert and the base and removably fastening the insert to the socket base.

4. A hand tool as defined in claim 3, and with opposite face of the insert being substantially completely exposed.

5. A hand tool as defined in claim 3, and with the insert being formed of a conventional insert material, such as hard carbide, ceramic material, ceramic coated material and the like, with the insert being immovably locked within the socket, between the opposed walls and the base thereof for protecting the insert against damage during use.

6. A manually operated tool for manually scraping or rubbing or marking a work piece, comprising:
    a handle shaped for fitting within a human hand for manually grasping the handle, with the handle having a forward end;
    a wafer-like conventional, flat, hard, disposable cutter insert mounted upon the forward end of the handle;
    a socket formed on the forward end of the handle for closely receiving and mounting said insert with the forward end of the socket being opened so that the insert extends forwardly of the handle with said socket including a substantially flat base surface arranged generally in a plane that extends longitudinally of the handle, and the other end of the socket including spaced apart, opposite sidewall surfaces extending perpendicular of the base surface, said socket side wall surfaces being acutely angled relative to the forward end of the socket to form an acute angle pair of wall surfaces for receiving and supporting a corner-like portion of an insert;

removable fastening means securing the insert within the socket so that the insert may be removed and replaced with other similar inserts.

7. A tool as defined in claim 6, and including said insert being selected from an insert having a predetermined peripheral shape, such as round, square, triangular, diamond-shaped, hexagonal shaped and the like and said socket being formed to receive different peripherally shaped inserts interchangeably whereby different shaped inserts may be substituted, one for the other, within the tool socket.

8. A tool as defined in claim 7, and said means for securing the insert with the socket comprising:

a screw fastener extending through an opening formed in the insert and into a corresponding, aligned, threaded opening formed in the socket for releasibly fastening the insert within the socket.

* * * * *